2,778,773
Patented Jan. 22, 1957

2,778,773

GUANIDINE SALTS OF N-HIGHER ALIPHATIC AMINO CARBOXYLIC ACIDS AND COMPOSITIONS THEREOF

William Wendell Wellman, Jersey City, N. J., assignor to Colgate-Palmolive Company, a corporation of Delaware No Drawing. Application June 1, 1953,
Serial No. 358,960

19 Claims. (Cl. 167—93)

The present invention relates to novel chemical compounds and, more particularly, to guanidinium derivatives of acylated amino carboxylic acids, and to compositions containing the same.

These novel materials are addition compounds or complexes of a guanidine compound and an N-aliphatic acyl amino carboxylic acid. An embodiment relates to compounds represented by the structural formula:

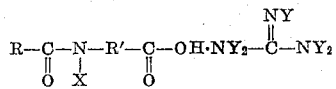

wherein R—CO— is a higher aliphatic acyl group such as higher fatty acyl, R' is a divalent lower aliphatic radical, X is selected from the group consisting of hydrogen and alkyl groups and Y is selected from the group consisting of hydrogen and monovalent organic groups. The group R' is preferably a straight or branched-chain alkylene group. Among the preferred compounds are materials of the following formula:

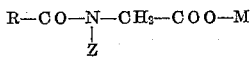

wherein R—CO— is a fatty acyl radical of about 12 to 16 carbon atoms, Z is selected from the group consisting of hydrogen and lower alkyl, and M is a guanidinium cation such as

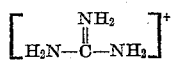

These compounds may be prepared in any suitable manner. A practical and economic mode of synthesis comprises reacting the N-aliphatic acyl amino acid with a basic guanidine compound such as guanidine carbonate under slightly elevated temperatures, e. g., up to refluxing temperatures, whereby the desired addition product is formed and may be separated from the reaction mixture in any suitable manner such as by precipitation, solvent extraction, etc. Thereafter, the resulting addition product may be further purified, if desired, such as by recrystallization from a solvent. The reaction to form an addition complex is facilitated and the product is recovered in high yield and purity if the reaction is conducted in the presence of an organic solvent in which the addition product is substantially insoluble upon cooling (including sparingly soluble), suitable solvents being acetone, alcohol and the like.

As indicated, the desired product is an addition compound formed by the interaction of an N-aliphatic acyl amino carboxylic acid with a basic guanidine compound. The higher fatty acyl amides of such amino acids and the like are known in the art and may be formed by the reaction of a higher fatty acylating substance, such as the fatty acid, acid chloride or ester, with an appropriate amino acid in the presence of a base. These higher fatty acids have about 8 to 24 carbon atoms usually, and preferably about 12 to 16 carbon atoms. It is preferred to prepare those derivatives wherein the aliphatic acyl radical is a saturated fatty acyl radical of about 12 to 16 carbon atoms, e. g., dodecanoyl, tetradecanoyl, hexadecanoyl, though other fatty acyl radicals of lower and higher molecular weight such as decanoyl, stearoyl and oleoyl may be used also. The amino acid portion of the molecule is generally derived from the lower aliphatic saturated amino carboxylic acids, such as, for example, those having up to about 6 carbon atoms. It is preferred that the amide compounds be derived from the amino substituted lower alkane monocarboxylic acids, particularly the alpha amino substituted acids. Suitable amino acids from which the amides may be derived are amino ethanoic acid (glycine), methylamino ethanoic (sarcosine), 2-amino propanoic acid (alanine), 3-amino propanoic acid, valine, leucine, glutamic acid, etc. Suitable examples of these amides which may be employed to form the addition compounds are N-lauroyl sarcosine, N-myristoyl sarcosine, N-palmitoyl sarcosine, N-lauroyl glycine, N-myristoyl glycine, N-stearoyl sarcosine, N-caproyl sarcosine, N-lauroyl alanine, N-higher fatty acyl sarcosine wherein the higher fatty acyl groups are derived from higher fatty acids of coconut oil or fractions thereof, etc.

Any suitable guanidine base may be employed to form an addition product with the above amide compounds. Guanidine per se is a strong organic base having the formula:

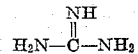

One or more of the above hydrogen atoms of the amino groups may be substituted readily by other organic groups. Suitable aliphatic groups which may be substituted are lower alkyl groups (e. g., methyl, ethyl, propyl), alkylol groups (e. g., ethanol, propanol), and substituted alkylol groups such as those formed by addition of a plurality of moles of ethylene oxide or the like. Suitable aromatic groups are phenyl, tolyl and the like, whereas a typical heterocyclic substituent is a pyridinyl group. Other suitable substituted guanidine compounds are biguanide, guanylurea, and guanylthiourea derivatives. Suitable examples of such substituted guanidine compounds are those having the formula:

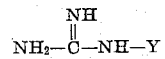

wherein Y is

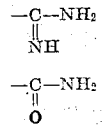

or

Accordingly, it is understood that the term "a guanidine" or its equivalent, as used in the specification and claims, is intended to cover guanidine itself and substituted guanidines.

Further examples of suitable addition compounds within the scope of the present invention are guanidinium N-lauroyl sarcosinate, guanidinium N-myristoyl sarcosinate, guanidinium N-higher fatty acyl sarcosinate wherein the higher fatty acyl groups are derived from coconut oil fatty acids, N' methyl guanidinium N-lauroyl sarcosinate, N' ethanol guanidinium N-lauroyl sarcosinate, guanidinium N-lauroyl glycinate, guanidinium N-myristoyl glycinate, guanidinium N-lauroyl alaninate, biguanidinium N-lauroyl sarcosinate, guanylurea N-lauroyl sarcosinate, guanylthiourea N-lauroyl sarcosinate, etc. The symbol N' above refers to a nitrogen which is part of the guanidine portion of the molecule.

The following examples are illustrative of the preparation of these compounds and it will be understood that the invention is not limited thereto. All parts are by weight unless otherwise specified.

EXAMPLE I

Approximately 55 parts of N-lauroyl sarcosine and 18 parts guanidine carbonate are mixed in a solvent medium of 500 parts of acetone and 50 parts of water. The resulting mixture is refluxed for five hours and forms a crystalline precipitation upon cooling to room temperature. This crystalline product is removed by filtration, redissolved in a hot water-acetone mixture of the same ratio as above and recrystallized therefrom by cooling. The resulting new compound is guanidinium N-lauroyl sarcosinate having a melting point of 114° C. and the formula:

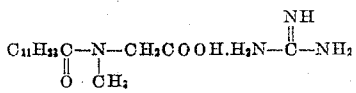

Following the above procedure, guanidine addition compounds are formed with N-myristoyl sarcosine, N-palmitoyl sarcosine, N-stearoyl sarcosine, N-oleoyl sarcosine, N-lauroyl glycine, N-myristoyl glycine and N-lauroyl alanine.

EXAMPLE II

Following the procedure of Example I, methyl guanidine is reacted with N-lauroyl sarcosine to produce the corresponding methyl guanidinium N-lauroyl sarcosinate compound as an addition product. Other guanidine compounds which may be used as an initial reactant are monoethanol guanidine, ethyl guanidine and phenyl guanidine.

EXAMPLE III

To a hot solution of guanylurea in ethyl alcohol there is added an equimolecular amount of N-lauroyl sarcosine in ethyl alcohol. The reaction mixture is heated with stirring to form as the desired product the corresponding guanylurea derivative of N-lauroyl sarcosine having the formula:

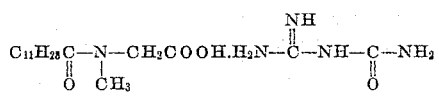

Following the above procedure, guanylurea addition compounds are formed with N-myristoyl sarcosine, N-palmitoyl sarcosine, N-stearoyl sarcosine, N-oleoyl sarcosine, N-lauroyl glycine, N-myristoyl glycine and N-lauroyl alanine.

These novel compounds possess various beneficial properties and, therefore, find utility in many fields of application. They may be employed in admixture with a carrier or vehicle of any suitable form, such as a solid, liquid or semi-solid carrier. These compounds in general exhibit a relatively high degree of stability in solution also. For example, the guanidinium N-fatty acyl amino carboxylic acid compound is highly soluble and stable in aqueous solution even at a moderately elevated temperature in comparison to the corresponding ammonium derivative. This stability is believed due to the resonating structure and strong basicity of the guanidinium ion which is considered to resonate among three equivalent structures.

Among the unusual properties possessed by these novel compounds is their marked anti-bacterial power, particularly on the oral flora normally present in the mouth, including lacto-bacilli micro-organisms and other bacteria. These compounds, particularly the guanidinum addition products with the N-fatty acyl amino acids havng about 12 to 16 carbons in the acyl radical, exhibit a significant inhibiting effect on the production of acid from fermentable carbohydrates by these micro-organisms found in saliva for example. This inhibiting effect may be determined by a dilution test using a Snyder medium. The Snyder test is well known in the art and is based on the rate of change of the color of an indicator, Brom-cresol-green, in a dextrose agar culture medium adjusted to a pH of 4.8–5.0 when it is inoculated with saliva which readily produces acid therein. Ordinarily, a test tube of such Snyder medium which has been treated with such saliva will turn from a green to a yellow color within 24 hours indicating acid production by the action of the micro-organisms or their enzymes upon the carbohydrates. Such color change generally occurs over the pH range of about 4.4 to 4.1. Each active ingredient or compound to be tested may be added in varying amounts to such media which have been inoculated with the saliva. The minimum amount of each active ingredient which is necessary to maintain a predominantly green color for 72 hours incubation at 37° C., and therefore exhibit acid inhibition is called herein the "dilution minimum." This "dilution minimum" is measured or calculated in milligrams of the active ingredient per 100 cc. of the saliva and represents the relative effectiveness of the ingredients for the inhibition of the acid production which normally results from the action of the bacteria in the saliva on the nutrient carbohydrate medium. More specifically, these tests may be conducted by heating 10 cc. of sterile dextrose agar containing the color indicator, in a test tube to liquefy the same, adding to the agar media while at a temperature of about 50–60° C. a quantity of 0.2 cc. of the saliva and about 0.1–0.5 cc. of any convenient solution of the active ingredient, and determining thereby the minimum amount of active ingredient which is necessary to maintain the desired color. The minimum number of mg. of active ingredient which is effective per 100 cc. of the saliva may be calculated from the quantities used in the test tubes.

The results on certain guanidine compounds are set forth in the table below:

*Table I*

| Compound | Dilution Minimum |
|---|---|
| a. Guanidinium N-lauroyl sarcosinate | 30. |
| b. Guanidine carbonate | Not Eff. at 625. |
| c. Guanidinium laurate | 50. |

Referring to the data above it will be evident that the guanidinium N-lauroyl sarcosinate is a highly effective antibacterial agent. In contrast thereto, the guanidine carobnate is not effective at such a high value as 625 mg. in the above test which indicates that it has no significant anti-bacterial activity in the indicated relationship. While the guanidinium laurate compound does show activity it is markedly less than the corresponding N-lauroyl sarcoside compound.

A further essential consideration is that the compounds of the present invention may exhibit the unusual property of being adsorbed and released by proteinaceous material. By reason of such property, these derivatives can exert prolonged anti-bacterial activity in such applications where it comes in contact with suitable proteinaceous materail such as mucin or casein. This protein adsorption phenomenon is highly specific and may be illustrated by the following test. A small amount of casein or essentially equivalent material such as mucin is immersed in a dilute solution of the ingredient to be treated. The protein is thereafter washed, dried and added to the above-described Snyder medium inoculated with the saliva. If a predominantly green color persists after 72 hours incubation, then a sufficient amount of the compound must have been retained by the protein and released subsequently in the Snyder medium. In this manner it is possible to determine a minimum amount of the compound which is effective to inhibit acid formation by the action of the bacteria in the saliva on the carbohydrate medium. Using this test with the same compounds, the following results are obtained, the value under the "Protein adsorption minimum" being the minimum number of mg. of the compound which is effective to prevent the acid formation per 100 cc. of the saliva as calculated from the quantities used in the test tubes.

Table II

| Compound | Protein adsorption Minimum |
| --- | --- |
| a. Guanidinium N-lauroyl sarcosinate | 5,000. |
| b. Guanidine carbonate | Not effective. |
| c. Guanidinium laurate | Do. |

It will be apparent from Table II that the guanidinium N-lauroyl sarcosinate possesses the unusual property of being adsorbed upon the protein material, and later released in the tube thereby preventing the acid formation from the fermentable carbohydrate. In contrast thereto, the guanidine carbonate was not effective at all in this test since it adversely affected the structure of the protein material such that no adsorption and release was possible. The guanidinium laurate compound was also ineffective when tested at values as high as 15,000 mg. per 100 cc. of saliva.

In general, the guanidine addition compounds of the present invention possess also significant detersive, foaming, softening, emulsifying and wetting power, and other surface-active properties in solution.

Accordingly, it is an embodiment of the present invention that these novel compounds may be utilized in preparations designed for applications for use in the mouth or the like. There may be prepared suitable tooth powders, toothpastes, dental creams, liquid dentifrices, mouth washes or rinses, tablets, lozenges, etc.

Any suitable amount of the selected guanidinium compound may be incorporated in the oral preparations. The specific amount will vary, naturally, depending upon the specific type of preparation, manner of use, and the effects desired, but will usually be a minor amount by weight of the final compositions, such as up to about 5%, and preferably from about 0.1 to about 4% by weight.

Various adjuvant materials may be incorporated in such preparations. Added materials in the formulation which do not substantially adversely affect the properties and characteristics may be suitably selected and used in proper amount depending upon the particular type of preparation. Such materials may be used as soluble saccharin, flavoring oils (e. g., oils of spearmint, peppermint, wintergreen), coloring or whitening agents (e. g., titanium dioxide), preservatives (e. g., sodium benzoate, etc.), alcohol, menthol, etc., in addition to other added materials or the like which are described in the present specification.

Any suitable practically water-insoluble polishing agent may be admixed with these novel compounds in the preparation of the dentifrice compositions such as tooth powders, pastes, creams, etc. There is a relatively large number of such materials known in the art. Representative materials include, for example, calcium carbonate, dicalcium phosphate (anhydrous or hydrated), tricalcium phosphate, insoluble sodium metaphosphate, aluminum hydroxide, magnesium carbonate, calcium sulfate, bentonite, etc., including suitable mixtures thereof. It is preferred to use the water-insoluble calcium or magnesium salts as the polishing agents and, more particularly, calcium carbonate and/or a calcium phosphate. In general, these polishing agents will comprise a major proportion by weight of the solid ingredients. The polishing agent content is variable, but will generally be up to about 95% by weight of the total composition. In the case of a dental cream such polishing agents will generally be about 20–75% whereas in tooth powders, the polishing agents will usually be in greater proportion, such as about 70–95%.

In the preparation of tooth powders, it is usually sufficient to mechanically admix the various solid ingredients. In dental cream formulations, the liquids and solids should necessarily be proportioned to form a creamy mass of desired consistency which is extrudible from a collapsible aluminum or lead tube. In general, the liquids in the dental cream will comprise chiefly water, glycerine, sorbitol, propylene glycol, etc., including suitable mixtures thereof. It is usually advantageous to use a mixture of both water and a humectant or binder such as glycerine, sorbitol, etc. The total liquid content will generally be about 20–75% by weight of the formulation. It is preferred to use also a gelling agent in dental creams such as the natural and synthetic gums and gum-like materials, e. g., Irish Moss, gum tragacanth, sodium carboxymethylcellulose, starch, etc., usually in an amount up to about 10%, and preferably about 0.5–5% of the formulation.

Mouth washes or rinses are also within the scope of the present invention. Such products are usually an effective amount of the guanidine active ingredient dissolved or dispersed in a suitably flavored liquid vehicle, preferably aqueous alcoholic vehicle. Any suitable amount, such as up to five percent active ingredient may be used. The alcohol concentration may vary depending on the mouth effect desired, such as about 5–70% alcohol, and preferably 5–40%. Liquid dentifrices are also included, such products usually containing a minor amount of active ingredients, usually dissolved or dispersed in an aqueous alcoholic vehicle, preferably containing a mucilaginous material and optionally combined with small amounts of polishing agent, alcohol, glycerine, coloring and flavoring materials.

In the case of chewing gum and other products, the guanidine compounds may be incorporated in any suitable manner during the usual manufacture of the product. For example, guanidinium N-lauroyl sarcosinate may be incorporated in a warm gum base with stirring to distribute the same uniformly therein. It may also be added to the exterior or outer surfaces of a gum base in order to coat the base. The usual gum bases may be used, representative materials being jelutong, rubber latex, Vinylite resins, etc., in addition to other usual materials such as plasticizers or softeners, sugar or other suitable carbohydrates such as glucose, sorbitol, etc.

Such novel guanidine compounds of the present invention which may be employed in these oral preparations are also suitable for use in food compositions, particularly such foods which comprise a fermentable carbohydrate which is susceptible to degradation wtih the production of acid by micro-organisms normally found in the oral cavity. Such guanidine derivatives may function thereby as a preservative or inhibitor of acid formation from the fermentable carbohydrate food, and preferably such foods containing a refined sweet fermentable sugar content (e. g., sucrose, dextrose, corn sirup, etc.). Among the food products are suitable milk or dairy products (e. g., ice cream), bakery products (e. g., sweet baked goods such as cake), confectionary or candy (e. g., fudge), beverages such as the popular carbonated beverages, fruit products, etc.

The novel compounds of the present invention find application in many other fields also including other cosmetic, detergent and pharmaceutical compositions. Among the varied types of products in which they may be employed for their detersive, foaming, emulsifying, wetting, anti-bacterial and other desired properties are shampoos, shaving creams, skin creams or lotions, detergent bars or cakes, textile-treating compositions and varied cleansing and laundering preparations. Such preparations may be prepared similarly in any suitable form including ointments, lotions, creams, jellies, bars or cakes, powders, etc. These compounds may be used in any suitable amount therein, and preferably from about 0.1 to about 50% by weight of the composition.

These guanidine compounds are compatible with other anionic and non-ionic materials usually for many types of preparations and may be admixed with the same in any suitable manner. Thus, they may be employed in combination with other organic materials such as water-soluble soaps (e. g., sodium soap of tallow, coconut oil, or palm oil fatty acids), and various synthetic detergents. Examples of such synthetic detergents are the water-soluble salts of sulfuric acid esters of polyhydric alcohols incompletely esterified with higher fatty acids, e. g., sodium coconut fatty acid monoglyceride monosulfate; the higher alkyl sulfates, e. g., sodium lauryl or coconut fatty alcohol sulfates; alkyl aryl sulfonate, e. g., sodium dodecyl benzene sulfonate; higher fatty acyl-alkylolamine condensation products, e. g., lauroyl diethanolamide and monoethanolamide; polyhydric alcohol esters of fatty acids, e. g., glyceryl monostearate, propylene glycol monolaurate, etc. The guanidine addition compounds may be admixed also with various inorganic materials having utility in surface-active fields. Examples of such materials are the various alkali metal phosphates (e. g., tetrasodium pyrophosphate, sodium tripolyphosphate), the alkali metal silicates, sulfates, carbonates, etc.

The following formulations prepared in the usual manner are additionally illustrative of the nature of the present invention and it will be understood that the invention is not limited thereto. All parts are by weight unless otherwise specified.

EXAMPLE IV
DENTAL CREAM

| | Percent |
|---|---|
| Guanidinium N-lauroyl sarcosinate | 2.00 |
| Dicalcium phosphate dihydrate | 44.25 |
| Calcium carbonate | 5.00 |
| Glycerine | 29.40 |
| Gum | 0.80 |
| Water | 14.95 |
| Tetrasodium pyrophosphate | 1.00 |
| Balance comprising minor amounts of flavor, saccharin, preservatives, etc. | Q. S. |

The dental cream is prepared as follows: The gum is suspended in the glycerine, the soluble saccharin, preservative, and the water are then added, the mixture is stirred and heated to 165° F. This temperature is maintained until the gum has completed swelling. The guanidinium N-lauroyl sarcosinate is then added and the components mixed thoroughly. The tetrasodium pyrophosphate is added with stirring and the mixture is well agitated. The mix is then cooled and the flavor is added. The formula is then again thoroughly milled, deaerated, and put in collapsible tubes. This dental cream exhibits considerable foaming, detersive and anti-bacterial power.

EXAMPLE V
DENTAL CREAM

| | Percent |
|---|---|
| Calcium carbonate | 25.0 |
| Insoluble sodium metaphosphate | 25.0 |
| Guanidinium N-myristoyl sarcosinate | 2.5 |
| Glycerine | 25.0 |
| Water | 18.0 |
| Gum, flavor, etc. | Q. S. |

EXAMPLE VI
TOOTH POWDER

| | Percent |
|---|---|
| Dicalcium phosphate dihydrate | 70.0 |
| Calcium carbonate | 24.0 |
| Guanidinium N-lauroyl sarcosinate | 3.0 |
| Soluble saccharin | 0.2 |
| Flavor | Q. S. |

EXAMPLE VII
MOUTH WASH

| | Percent |
|---|---|
| Guanidinium N-lauroyl sarcosinate | 0.1–0.2 |
| Ethyl alcohol | 10.0 |
| Flavor | 0.2 |
| Soluble saccharin | 0.1 |
| Water | Q. S. |

EXAMPLE VIII
CHEWING GUM

| | Percent |
|---|---|
| Gum base, e. g., chicle | 20.0 |
| Sucrose | 60.0 |
| Corn syrup | 18.5 |
| Flavor | 1.0 |
| Guanidinium N-lauroyl sarcosinate | 0.5 |

EXAMPLE IX
SHAMPOO

| | Percent |
|---|---|
| Guanidinium N-lauroyl sarcosinate | 20.0 |
| Aqueous ethanol (9:1) | 80.0 |

EXAMPLE X
SHAVING CREAM

| | Percent |
|---|---|
| Stearic acid | 30.0 |
| Carbitol | 5.0 |
| Triethanolamine | 1.0 |
| Guanidinium N-lauroyl sarcosinate | 1.0 |
| Perfume | .5 |
| Water | Q. S. |

Although the present invention has been described with reference to particular embodiments and examples, it will be apparent to those skilled in the art that variations and modifications of this invention can be made and that equivalents can be substituted therefor without departing from the principles and true spirit of the invention.

Having thus described the invention what is claimed is:

1. A guanidine salt represented by the formula:

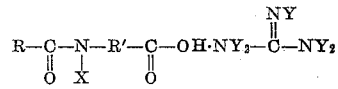

wherein R—CO— is a higher aliphatic acyl group, R' is a divalent lower aliphatic radical, X is selected from the group consisting of hydrogen and alkyl groups, and Y is selected from the group consisting of hydrogen and monovalent organic groups.

2. A compound having the structural formula:

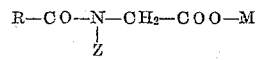

wherein R—CO— is a fatty acyl radical of about 12 to 16 carbon atoms, Z is selected from the group consisting of hydrogen and lower alkyl, and M is a guanidinium cation.

3. A guanidine salt of an N-higher aliphatic acyl lower aliphatic amino carboxylic acid having about 12 to 16 carbon atoms in said acyl group.

4. Guanidinium N-higher fatty acyl lower aliphatic monoaminocarboxylate.

5. Guanidinium N-higher fatty acyl sarcosinate.

6. Guanidinium N-lauroyl sarcosinate.

7. Guanidinium N-myristoyl sarcosinate.

8. Guanidinium N-palmitoyl sarcosinate.

9. Guanidinium N-lauroyl glycinate.

10. Guanylurea N-higher fatty acyl sarcosinate.

11. A preparation comprising a minor proportion of a guanidine salt of an N-higher aliphatic acyl lower aliphatic amino carboxylic acid, and a carrier therefor.

12. A preparation comprising a minor amount of a compound having the structural formula:

$$R-CO-N(Z)-CH_2-COO-M$$

wherein R—CO— is a fatty acyl radical of about 12 to 16 carbon atoms, Z is selected from the group consisting of hydrogen and lower alkyl and M is a guanidinium cation, and a carrier therefor.

13. A preparation in accordance with claim 12 in the form of a chewing gum.

14. A preparation in accordance with claim 12 in the form of a dental cream.

15. A preparation in accordance with claim 12 in the form of a tooth powder.

16. An oral preparation comprising a minor amount of guanidinium N-saturated higher fatty acyl sarcosinate having about 12 to 16 carbon atoms in said acyl group.

17. A preparation in accordance with claim 16 in the form of a chewing gum.

18. A preparation in accordance with claim 16 in the form of a dental cream.

19. A preparation in accordance with claim 16 in the form of a tooth powder.

References Cited in the file of this patent

UNITED STATES PATENTS

| | | |
|---|---|---|
| 2,047,066 | Glietenberg | July 7, 1936 |
| 2,063,987 | Dreyfus | Dec. 15, 1936 |
| 2,156,193 | Puetzer | Apr. 25, 1939 |
| 2,463,779 | Kester | Mar. 8, 1949 |

FOREIGN PATENTS

| | | |
|---|---|---|
| 459,039 | Great Britain | Dec. 28, 1936 |
| 675,837 | Germany | Apr. 27, 1939 |

OTHER REFERENCES

Kameda et al.: Chem. Abs., 44, 1564–5 (1950).

Thomssen: Drug and Cosmetic Ind., November 1944, pp. 537, 618–620, December 1944, pp. 672, 673, 748–753. (Copy in Sci. Lib.)

Soap, May 1940, pp. 35 and 67 ("Detergents"). (Copy in Sci. Lib.)